(12) United States Patent
Hesketh et al.

(10) Patent No.: US 11,519,353 B2
(45) Date of Patent: Dec. 6, 2022

(54) METHOD OF OPERATING AN INTERNAL COMBUSTION ENGINE

(71) Applicant: Ford Global Technologies, LLC, Dearborn, MI (US)

(72) Inventors: David Hesketh, Ingatestone (GB); Aaron John Oakley, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 16/421,380

(22) Filed: May 23, 2019

(65) Prior Publication Data
US 2019/0360417 A1 Nov. 28, 2019

(30) Foreign Application Priority Data
May 24, 2018 (GB) ...................................... 1808525

(51) Int. Cl.
 *F02D 41/04* (2006.01)
 *F02M 26/47* (2016.01)
 (Continued)

(52) U.S. Cl.
 CPC ........... *F02D 41/042* (2013.01); *B60W 10/06* (2013.01); *B60W 20/00* (2013.01); *F02D 9/02* (2013.01); *F02D 17/04* (2013.01); *F02D 41/0077* (2013.01); *F02D 41/30* (2013.01); *F02M 26/47* (2016.02); *B60Y 2200/92* (2013.01); *F02D 2009/022* (2013.01); *F02D 2009/023* (2013.01); *F02D 2009/0222* (2013.01); *F02D 2009/0225* (2013.01); *F02D 2009/0235* (2013.01); *F02D 2009/0245* (2013.01);
 (Continued)

(58) Field of Classification Search
 CPC .......... F02D 41/04; F02D 41/042; F02D 9/02; F02D 17/04; F02D 41/0077; F02D 41/30; B60W 10/06; B60W 20/00; F02M 26/47; F02M 2026/005; F02M 2026/004
 See application file for complete search history.

(56) References Cited

U.S. PATENT DOCUMENTS 4,174,027 A * 11/1979 Nakazumi ............... F02M 26/57
                                                         477/181
6,195,985 B1    3/2001 del Re et al.
(Continued)

FOREIGN PATENT DOCUMENTS

| DE | 19735455 C1 | 11/1998 |
| GB | 2375143 A | 11/2002 |
| GB | 2431733 A | 5/2007 |

OTHER PUBLICATIONS

Great Britain Intellectual Property Office, Combined Search and Examination Report under Sections 17 and 18(3) Issued in Application No. GB1808525.8, dated Nov. 6, 2018, 7 pages.

*Primary Examiner* — Jacob M Amick
(74) *Attorney, Agent, or Firm* — Vincent Mastrogiacomo; McCoy Russell LLP

(57) ABSTRACT

Methods and systems are provided for an engine. In one example, a method comprises stopping an engine via a soft-stop method in response to a likelihood of condensate forming being less than or equal to a threshold likelihood. The method further comprises stopping the engine via an exhaust gas evacuation method in response to the likelihood of condensate forming being greater than the threshold likelihood.

18 Claims, 4 Drawing Sheets

(51) Int. Cl.
*B60W 10/06* (2006.01)
*B60W 20/00* (2016.01)
*F02D 9/02* (2006.01)
*F02D 17/04* (2006.01)
*F02D 41/00* (2006.01)
*F02D 41/30* (2006.01)
*F02M 26/00* (2016.01)

(52) U.S. Cl.
CPC .......... *F02D 2009/0276* (2013.01); *F02D 2200/021* (2013.01); *F02D 2200/0414* (2013.01); *F02D 2200/0418* (2013.01); *F02D 2200/0614* (2013.01); *F02D 2200/101* (2013.01); *F02D 2200/60* (2013.01); *F02D 2200/602* (2013.01); *F02M 2026/004* (2016.02); *F02M 2026/005* (2016.02)

(56) References Cited

U.S. PATENT DOCUMENTS

| | | |
|---|---|---|
| 6,318,334 B1 | 11/2001 | Reale et al. |
| 9,284,920 B2 * | 3/2016 | Leone .................. F02M 26/43 |
| 2002/0073955 A1 | 6/2002 | Collins et al. |
| 2002/0165659 A1 | 11/2002 | Boggs et al. |
| 2013/0018564 A1 | 1/2013 | Coatesworth et al. |
| 2014/0046577 A1 | 2/2014 | Wang et al. |
| 2015/0136076 A1 * | 5/2015 | Styles .................. F02D 41/042 |
| | | 123/325 |
| 2015/0211447 A1 * | 7/2015 | Takaki ................. F02D 41/126 |
| | | 123/559.1 |

* cited by examiner

METHOD OF OPERATING AN INTERNAL COMBUSTION ENGINE

CROSS REFERENCE TO RELATED APPLICATION

The present application claims priority to United Kingdom patent application No. 1808525.8, filed on May 24, 2018. The entire contents of the above-listed application are hereby incorporated by reference for all purposes.

FIELD

The present description relates generally to mitigating condensate formation on a fuel injector of an engine during an engine stop.

BACKGROUND/SUMMARY

Modern motor vehicles may comprise a start-stop system configured to shut down an engine of the motor vehicle when the engine is not used to drive the vehicle, for example, which may occur when the vehicle is stationary at a traffic signal. Stopping the engine in this way reduces fuel consumption of the engine and the production of polluting gases, by reducing the amount of time that the engine spends idling.

Because the engine is potentially stopped and started multiple times during a single journey, it is desirable for the noise, vibration, and harshness (NVH) of the engine during a stop event to be minimized, so that the driver experiences minimal vibrations or shaking of the vehicle when the engine stops.

In order to minimize undesirable shaking of the engine during an engine stop, vehicles may implement a soft-stop strategy by which the forces generated by the movement of the engine pistons are reduced. Previous examples of a proposed soft-stop strategy comprise sealing the intake manifold of the engine using a throttle and continuing to supply fuel to the engine so that the engine continues to run, until there is insufficient air being drawn into the cylinders to support combustion and the engine stalls.

Shutting the engine down in this way may reduce the pressure of air within the intake manifold, so that the pressure of the inlet air being drawn into the cylinders is reduced. This in turn reduces the magnitude of forces on the pistons of the engine, reducing vibrations of the engine.

The combustion events occurring shortly before the engine stalls can leave combustion products within the cylinders that are not expelled from the cylinders after the engine has stopped. Furthermore, because of the pressure differential across the engine between the inlet and exhaust manifolds, exhaust gases can be drawn back into the cylinders from the exhaust manifold when the engine stops.

In one example, the issues described above may be addressed by a system that comprises an engine comprising an exhaust gas recirculation passage fluidly coupled to an engine intake and a controller with computer-readable instructions stored on non-transitory memory thereof that when executed enable the controller to actuate a valve of the exhaust gas recirculation passage to a closed position and maintain an intake throttle position for a period of time based on a position of the valve prior to being actuated to the closed position in response to an engine stop request. In this way, the engine stop NVH may only be increased if it is determined that the fuel injector may collect condensate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
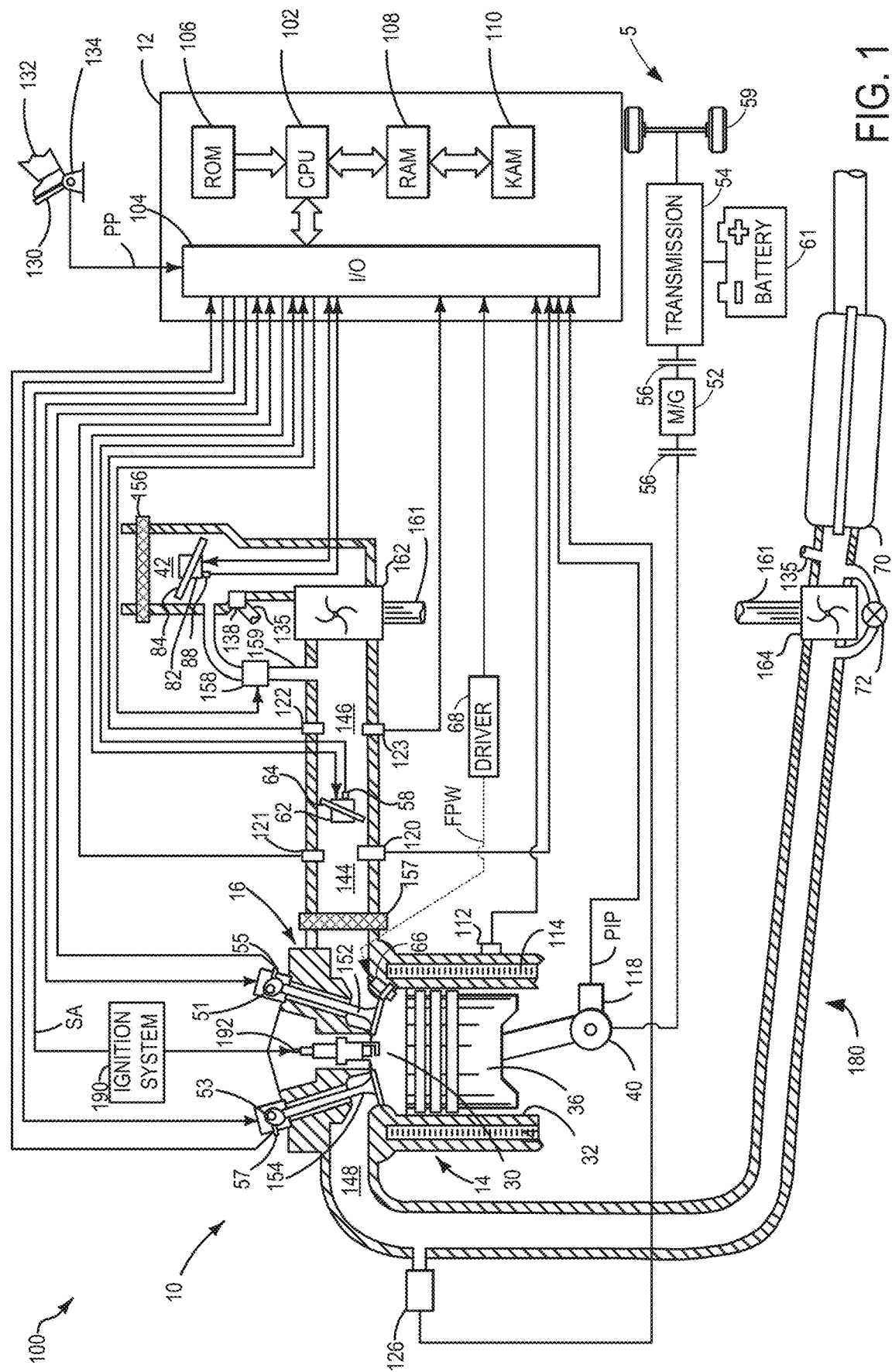
FIG. 1 shows a schematic view of a cylinder of an engine assembly.
Figure 2:
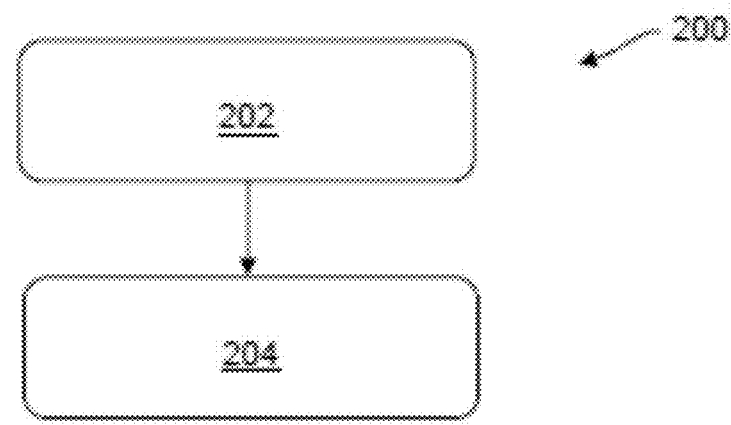
FIG. 2 shows a flow chart depicting a method of shutting down an engine assembly using a soft-stop strategy.
Figure 3:
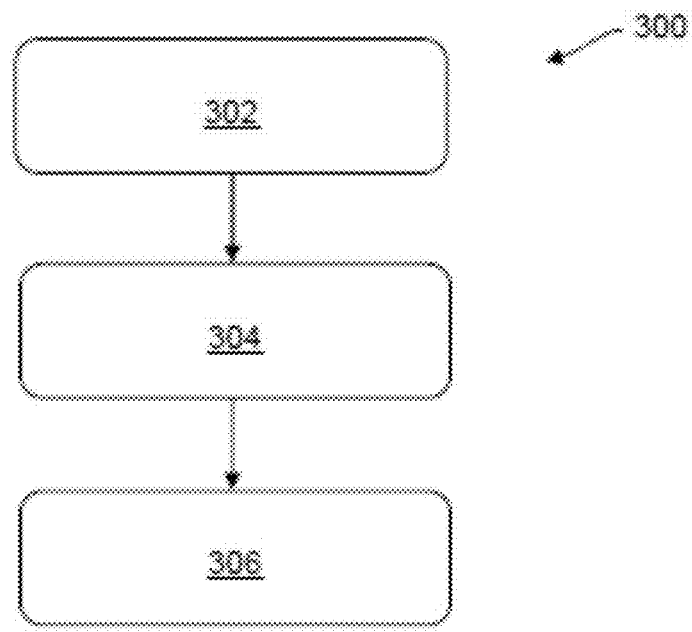
FIG. 3 illustrates a method for shutting down an engine assembly for minimizing EGR deposits.
Figure 4:
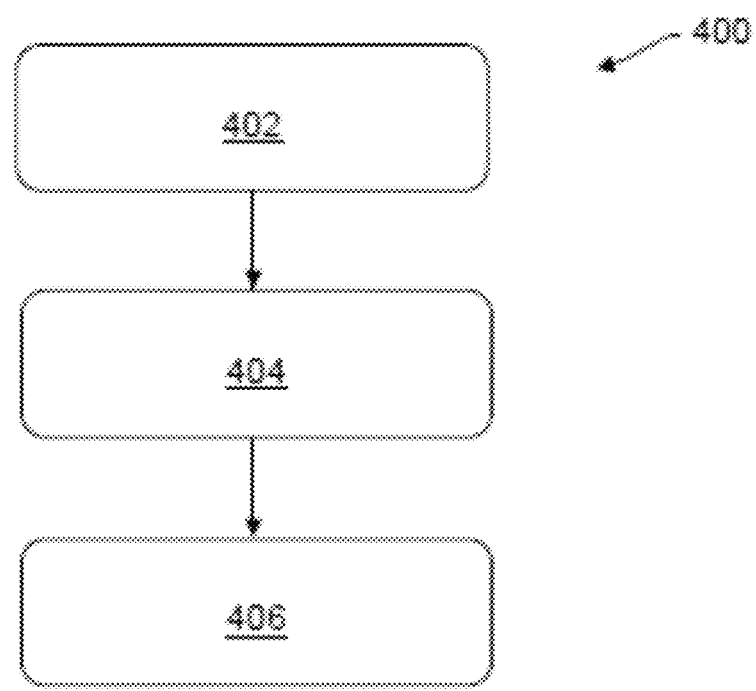
FIG. 4 illustrates a method for selecting to shut down an engine assembly using the soft-stop strategy or the strategy for minimizing EGR deposits.
Figure 5:
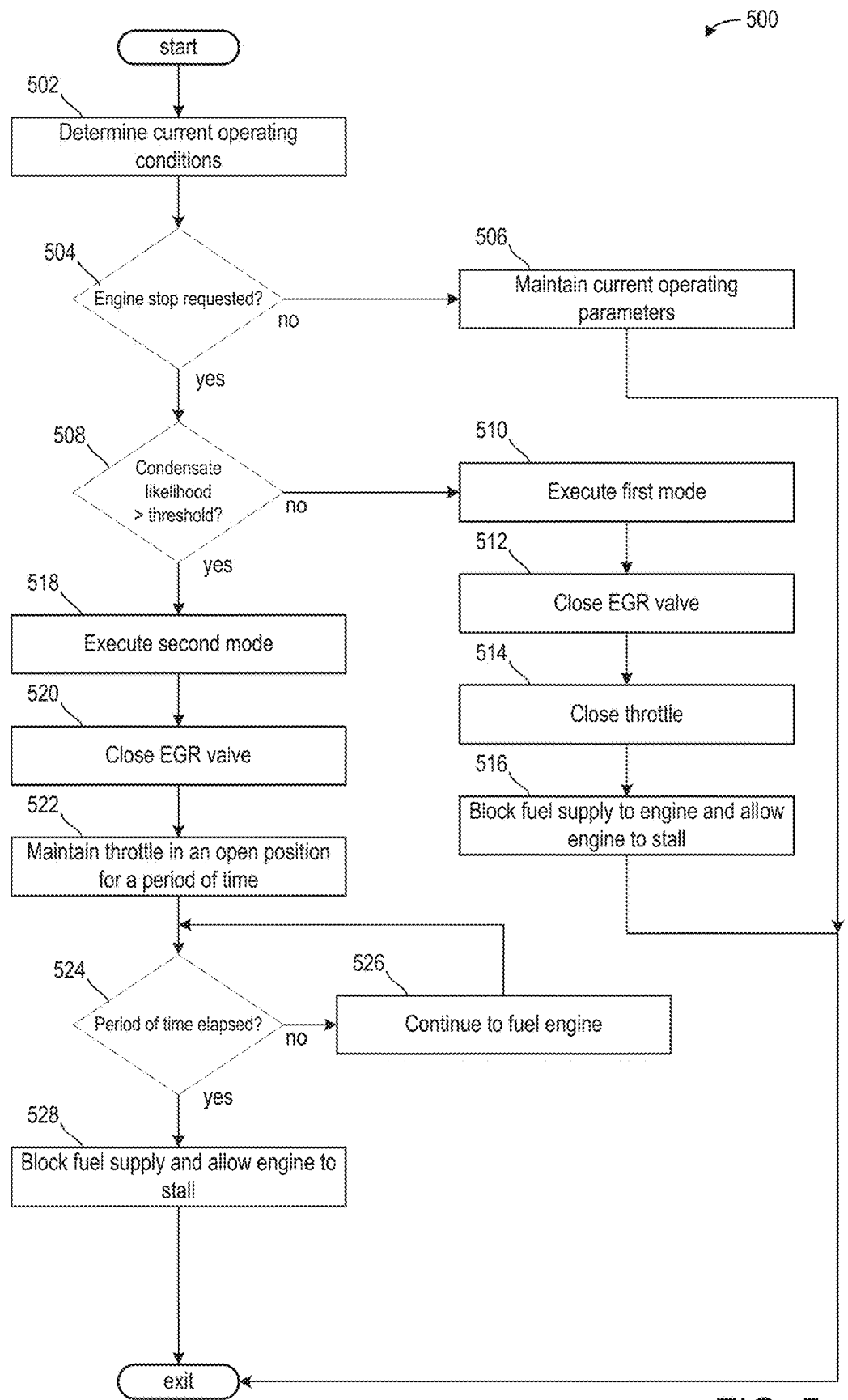
FIG. 5 illustrates a method for selecting a first or a second engine shutdown mode.

The following description relates to systems and methods for mitigating condensate formation onto a fuel injector. A cylinder comprising the fuel injector is shown in FIG. 1. The cylinder may be a single cylinder of a plurality of cylinders of the engine, wherein the engine maybe configured to stop during some conditions. A method for stopping the engine in a first mode (e.g., a soft-stop method) is shown in FIG. 2. A method for stopping the engine in a second mode (e.g., an exhaust evacuation mode) is shown in FIG. 3. A method for selecting between the first mode and the second mode is shown in FIG. 4. A method for selecting between the first mode and the second mode and executing each of the first and second modes is shown in FIG. 5.

According to an aspect of the present disclosure, there is provided a method of shutting down an engine assembly, the engine assembly comprising an exhaust gas recirculation system having a valve for controlling the flow of exhaust gases through the exhaust gas recirculation system. The method may comprise closing the valve of the exhaust gas recirculation system in response to an engine stop being requested to block the flow of EGR to the engine. The method may further comprise maintaining an inlet throttle of the engine assembly in an open position for a period of time, which, in one example, may be based on a position of the valve prior to closing the valve. The method may further comprise cutting the supply of fuel to the engine following the period of time, e.g. whilst the inlet throttle is in the open position.

The supply of fuel to the engine may be cut instantly to zero or may be reduced gradually to zero.

In one example, the period of time may be greater than or equal to 500 ms and less than or equal to 1000 ms. For example, the period of time may be 700 ms. The period may be determined based on a position of the EGR valve prior to the EGR valve being closed in response to the request to stop the engine. Alternatively, the period of time may be a predetermined period independent of the EGR valve position, wherein the predetermined period is sufficient to expel a maximum amount of EGR, as will be described below.

The throttle may be maintained in the open position until the engine as stopped. In other words, the engine may be allowed to run down with the throttle open until fuel is no longer available to combust. This may correspond with EGR being evacuated from the intake manifold and engine.

The method may further comprise running the engine at a speed greater than a threshold idle speed. The threshold idle speed may correspond to an idle speed of the engine during an idle condition where an engine stop is not desired. The method may comprise increasing the idle speed of the engine prior to cutting the fuel supply to the engine. By increasing the idle speed, the period of the time the throttle is left open may be decreased, and the engine may be stopped (e.g., shutdown) sooner due to EGR being evacuated more quickly via the increased engine idle speed (e.g., increased relative to the threshold idle speed). In some examples, the threshold idle speed may be between 600 to 1,000 rotations per minute (rpm). The increased idle speed may be equal to an idle speed greater than this range (e.g., 1,200 rpm).

According to another aspect of the present disclosure, there is provided a method of operating an engine assembly, the method comprising determining an engine stop request, determining a likelihood of condensate formation within cylinders of the engine assembly after the engine has been shut down. The likelihood of condensate formation may be based on a presence of exhaust gases within one or more engine cylinders after the engine has been shutdown, wherein the presence of exhaust gas may increase the likelihood of condensate formation. If the likelihood of condensate formation is less than a threshold likelihood, then the engine shutdown may include executing a "soft-stop" as described above and as described in greater detail below with respect to FIG. 2. If the likelihood of condensate formation is greater than or equal to the threshold likelihood, then the method may include executing the engine stop where exhaust gases are evacuated from the intake manifold and engine to limit and/or block condensate formation.

The engine assembly may comprise a compression ignition engine. The engine assembly may comprise an exhaust gas recirculation system having a valve for controlling the flow of exhaust gases through the exhaust gas recirculation system.

Alternatively, if it is determined that the likelihood of condensation is below a threshold value (e.g., the threshold likelihood), the engine shut down procedure may be selected to minimize vibrations of the engine during the engine shut down. For example, the selected engine shut down procedure may comprise closing an inlet throttle of the engine assembly, prior to reducing the amount of fuel supplied to the engine cylinders, e.g. prior to cutting fuel to the engine cylinders.

The method may comprise determining, (e.g. measuring or predicting), an environmental property of the engine. The likelihood of condensate formation within the cylinders after the engine has been shut down may be determined according to the environmental property of the engine.

The environmental property may comprise one or more selected from a temperature and a humidity of the engine assembly. The temperature may be an engine coolant temperature, an engine housing temperature, such as an engine cylinder head temperature, an engine exhaust temperature and/or an engine inlet temperature. The humidity may be a humidity of inlet air within the engine, e.g. within an intake manifold and/or a cylinder of the engine.

The method may comprise determining a current engine run time, wherein the current engine run time may be equal to a time since the engine was last started. The likelihood of condensate formation within the cylinders after the engine has been shut down may be determined based on the current engine running time. For example, if the engine run time is above a threshold run time, it may be determined that the likelihood of formation of condensation is lower than the threshold likelihood.

The method may comprise determining a time since a previous engine shut down. The likelihood of formation of condensation within the cylinders after the engine has been shut down may be determined according to the time since the previous engine shut down. For example, if the engine was recently shut down and the time since a previous engine shut down is less than a threshold shut down time, it may be determined that the likelihood of condensate formation is lower than the threshold likelihood.

The method may comprise determining an engine running time of a previous engine run event. The likelihood of formation of condensation within the cylinders after the engine has been shut down may be determined according to the engine running time of the previous engine run event.

According to another aspect of the present disclosure, there is provided an engine assembly comprising an internal combustion engine an exhaust gas recirculation system having a valve for controlling the flow of exhaust gases through the exhaust gas recirculation system and a controller with instructions stored in non-transitory memory thereof that when executed enable it to perform the various engine shut down steps.

To avoid unnecessary duplication of effort and repetition of text in the specification, certain features are described in relation to only one or several aspects or embodiments of the invention. However, it is to be understood that, where it is technically possible, features described in relation to any aspect or embodiment of the disclosure may also be used with any other aspect or embodiment of the disclosure.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes.

However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

The use of exhaust gas recirculation has become increasingly popular as a way of reducing the formation, and hence, the emission of NOx from motor vehicles. In some arrangements, exhaust gas recirculation may be used at substantially all running conditions of the engine 10.

If the engine is shut down using a "soft-stop" shut down procedure, such as the procedure mentioned above, whilst recirculated exhaust gases are present within the intake manifold 144 and/or the cylinder 30, an increased quantity of exhaust gases can remain within the cylinder 30 of the engine 10 after the engine has stopped.

Exhaust gases that remain in the cylinders 30 following engine shut down can form corrosive condensates on the fuel injector nozzles 66 that can corrode the nozzles and thereby affect the sizes of the nozzle apertures. The use of soft-stop shut down procedures together with increased use of exhaust gas recirculation can therefore lead to increased corrosion of injector nozzles, which may demand early replacement of the injector nozzle 66.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate uncooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a NOx trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine. In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 may be stopped (e.g., shut down) when requested by a vehicle operator based on one or more operator behaviors such as releasing the input device 130, depressing an ignition button, and/or turning an ignition key.

Additionally, the controller 12, or another controller, may be configured to perform a shutdown procedure of the engine 10 when it is determined that the engine should be shut down. For example, it may be determined that the engine should be shut down based on a control input from the driver, e.g. using an ignition key or switch. Alternatively, the controller 12, or another controller, may determine that the engine should be shut down as part of a stop-start event, or in order to transition to a period of electric only operation, e.g. during which the vehicle is driven by the electric motor 52 provided on the vehicle. When the engine 10 is stopped, a fuel supply to the engine 10 may be stopped, wherein the fuel injector 66 may no longer deliver fuel to the combustion chamber 30. Following the fuel supply being blocked, the engine shutdown may be executed via parameters according to a first mode (e.g., the soft-stop shutdown described above) or a second mode (e.g., condensate mitigation shutdown described above) as will be described in greater detail below.

Turning now to FIG. 2, it shows a method 200 for executing a first mode of shutting down the engine. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The first mode may interchangeably be referred to as the soft-stop method. The controller 12 may be configured to shut down the engine 10 of the motor vehicle using the soft stop method. The method 200 comprises a first step 202 in which the EGR valve 138 is closed. The method further comprises a second step 204, in which the throttle 62 is closed in order to restrict the flow of inlet air from the boost chamber 146 to the intake manifold 144. In some arrangements, the throttle 62 may substantially seal the intake manifold 144 from the boost chamber 146 and the intake passage 42 of FIG. 1.

By closing the throttle 62, the pressure within the intake manifold 144 begins to decrease, due to gases being drawn from the intake manifold 144 into the engine cylinder 30.

After a period of running of the engine 10 following the throttle 62 being closed, the engine may stall due to the lack of air within the intake manifold 144. As described above, because the pressure within the intake manifold is low when the engine stops running, the magnitude of vibrations generated as the engine stops are reduced, compared to if the engine was stopped whilst the intake manifold was at atmospheric pressure.

Shutting down the engine using the soft-stop method 200 may lead to corrosive condensates forming on the fuel injector nozzle 66 even if the EGR valve 138 is closed prior to shutting the inlet valve. As described above, corrosive condensates forming on the fuel injector nozzle 66 may cause corrosion of the fuel injector nozzle.

Turning now to FIG. 3, it shows a method 300 to reduce the risk of corrosion of the fuel injector nozzles.

The engine shut down method 300 comprises a first step 302, in which the EGR valve 138 is closed. Closing the EGR valve reduces the rate of recirculation of exhaust gases to the intake and therefore reduces the flow of EGR to the cylinder.

The method 300 further comprises a second step 304, in which the throttle 62 is maintained in an open position for a period of time.

The period of time may be selected in order to enable sufficient inlet air to be drawn into the intake manifold 144 through the inlet throttle 62 to replace exhaust gases that may be present within the intake. The exhaust gases that are present and desired to be evacuated may be from before the EGR valve 138 was closed in the first step 302. For example, the period of time may be greater than or equal to 500 ms. In some examples, the period of time may be based on an amount of time where a vehicle operator may not notice the second method being executed. In some examples, additionally or alternatively, an alert may be displayed to the vehicle operator such that the period of time may be extended, if desired, so that the intake may be completely evacuated of EGR in response to the engine stop request.

The period of time may be determined based on the position of the EGR valve 138 and/or the quantity of EGR gases expected to be within the intake manifold prior to the method 300 being performed. For example, if the EGR valve 138 is in a fully open position, the period of time may be longer than if the EGR valve is in a partially open position prior to the method 300 being performed. Alternatively, the period of time may be a predetermined period of time that does not vary based on current operating conditions of the engine 10.

It may be undesirable for the period of time to be so long that the driver is aware of a delay between requesting that the engine is shut down, e.g. by turning an ignition key, and the engine stopping. Hence, the period of time may be selected to be less than or equal to 1000 ms. In one arrangement, the period of time is a predetermined period of 700 ms. Additionally or alternatively, if the stop request is a stop request based on turning an ignition key or depressing an ignition button, then the period of time may selectively be extended during such a stop request compared to a stop request corresponding to a start/stop procedure. During a start/stop procedure, the period of time may be based on a predicted duration of the stop event, wherein the predicted duration may be based on feedback from a navigation system, other on-road vehicle, previously learned traffic patterns, and the like.

The method 300 further comprises a third step 306, in which the supply of fuel to the engine 10, (e.g. to the cylinder 30 of the engine 10), is cut. The supply of fuel may be cut substantially instantaneously, (e.g. reduced to no fuel being injected as quickly as possible). In other words, the supply of fuel may be stopped without being ramped down gradually.

The throttle 62 may be maintained in the open position whilst the fuel is cut. Additionally, the throttle 62 may be maintained in the open position whilst the engine runs down following the fuel supply being cut. In this way, clean air may be drawn through the intake manifold 42 and the cylinder 30 as the engine 10 runs down, which may displace burnt exhaust gases from the cylinder 30.

The number of rotations performed by the engine, and hence, the number of intake stokes performed by the piston 36 may depend on the speed at which the engine was running prior to the fuel being cut. For example, if the engine is running at an idle speed of approximately 850 to 900 RPM prior to the fuel being cut, the engine 10, e.g. the crank shaft 40 of the engine, may perform 2 or 3 full rotations after the fuel is cut. Hence, each piston 36 of the engine may perform between 1 and 2 intake strokes, in which clean air is draw into the corresponding cylinder 30.

In some arrangements, in order to increase the number of rotations performed by the engine 10 following the fuel being cut, the engine 10 may be run at a speed greater than a normal idle speed of the engine prior to the fuel being cut in the third step 306. For example, the idle speed of the engine may be increased, or the engine may be run at a speed greater than idle speed prior to the fuel being cut. In some examples, the idle speed may be increased if it is determined that the period of time in which the throttle will be maintained open is insufficient to evacuate the exhaust gases in the intake to a desired amount, wherein the desired amount corresponds to an amount of exhaust gas that may not degrade the fuel injector.

Additionally or alternatively the engine idle speed may be increased via an increased fuel injection amount. Additionally or alternatively, the throttle may be moved to a more open position to increase the engine speed to an engine speed greater than the threshold engine speed. In this way, in some examples, the throttle may be moved to a position more open than its position prior to the engine stop request.

When the engine is shut down in this way, the amount of exhaust gases present in the cylinder 30 when the engine has stopped may be reduced compared to when the engine is stopped using the soft-stop method 200. Hence, the formation of corrosive condensates on the fuel injector nozzle 66 and the risk of corrosion of the fuel injector nozzles may be reduced.

However, because the pressure within the intake manifold 144 is substantially equal to atmospheric pressure when the engine is stopped, the forces generated when the engine comes to a stop have a greater magnitude than the forces generated during the soft-stop procedure 200 and the vibrations produced during engine shut down are correspondingly greater.

It may therefore be desirable to balance the benefits of reducing corrosion of the fuel nozzles 66 with the increase in vibrations caused during the engine shutdown method 300. Because vibrations of the engine 10 during shut down may be noticeable to a driver of the vehicle, and may give the impression that the engine or vibration damping system is not operating correctly, it may be desirable to shut down the engine using the shutdown method 300 only if the formation of corrosive condensates is likely. This may serendipitously be timed in conjunction with the shift to the all-electric mode described above, such that the vibrations generated during the method 300 may be masked and/or mixed with vibrations experienced due to road conditions. That is to say, if the method 300 is executed during a beginning of an all-electric mode of the vehicle, then vehicle occupants may not be able to decipher between vibrations generated due to the method 300 and the road conditions.

Turning now to FIG. 4, it shows a method 400 for selecting between the method 200 and the method 300.

The method 400 comprises a first step 402, in which it is determined whether an engine shutdown request is present. For example, the engine shutdown request may be present based on a control input from the driver, e.g. using an ignition key or switch. Alternatively, the controller 12, or another controller, may determine that the engine should be shut down as part of a stop-start event, or in order to transition to a period of electric-only operation.

The method 400 comprises a second step 404, in which the likelihood of the formation of condensation within the cylinders after the engine has been shut down, e.g. if exhaust gases remain within the cylinders following the engine shut down, is determined. For example, it may be determined whether the likelihood of formation of condensates is above, below or equal to a threshold value.

The likelihood of formation of condensation may be determined based on an environmental condition of the engine 10, such as a temperature of the engine cylinder and/or a temperature or humidity of gases within the cylinder. Additionally or alternatively, the likelihood of formation of condensation may be determined based on one or more engine running or shut down times relating to the engine assembly, as described below.

Referring to FIG. 1, the engine 10 may comprise one or more temperature sensors, such as the engine coolant temperature sensor 112, an intake manifold temperature sensor, a cylinder head temperature sensor, an exhaust temperature sensor (e.g., exhaust gas sensor 126), or other engine assembly temperature sensors. Additionally or alternatively, the engine 10 may comprise one or more humidity sensors, such as an intake manifold humidity sensor 123 or any other engine assembly humidity sensor.

The controller 12 may receive measurements from the temperature sensors and/or the humidity sensor and may be configured to determine the likelihood of the formation of condensation within the cylinders after the engine has been shut down, e.g. during the second step 404 of the method 400, using the measurements.

Additionally or alternatively, the controller 12 may be configured to determine the likelihood of the formation of condensation within the cylinders after the engine has been shut down based on a current engine run time, e.g. how long the engine has been running since it was last started. For example, if the current engine run time is above a threshold time, it may be determined that the likelihood of the formation of condensation is low, e.g. below the threshold value. Additionally or alternatively, the current engine run time may be used to determine a predicted temperature of the engine assembly, the predicted temperature may be used to determine the likelihood of formation of condensation.

The controller 12 may be configured to determine a previous engine run time, e.g. the time the engine spent running during a previous period of operation of the engine 10. The controller 12 may be configured to determine a predicted temperature of the engine 10 at the time that the engine was previously shut down based on the previous engine run time. Additionally or alternatively, the controller 12 may be configured to store measurements from the engine assembly temperature and/or humidity sensors relating to the previous period of operation, e.g. in a memory associated with the controller 12.

The controller 12 may be configured to determine a time since the engine was previously shut down. The likelihood of the formation of condensation within the cylinders may be determined based on the time since the engine was previously shut down. For example, the controller 12 may determine how long the engine was not running, e.g. between the previous engine shut down and a recent engine start, and may determine a temperature of the engine assembly at least partially based on the time the engine was not running. The temperature of the engine assembly may additionally be determined based on the stored or predicted temperature of the engine assembly at the time that the engine was shut down, e.g. together with the current engine run time.

In some examples, the controller 12 may be configured to consider engine run times and times the engine spent shut down for a number of prior periods of operation of the engine, in order to determine the likelihood of the formation of condensation. For example, the controller 12 may calculate the total amount of time the engine spent running and/or the total amount of time the engine spent shut down over a period of time, such as 30 minutes, 1 hour, 2 hours or any other desirable period of time, prior to the engine shut down about to be performed, and may determine the likelihood of formation of condensation based on the calculated total times.

The method 400 further comprises a third step 406, in which an engine shut down procedure is selected based on the likelihood of formation of condensation. For example, if the likelihood of formation of condensation is equal to or below the threshold value, the soft-stop engine shut down method 200 may be selected. Alternatively, if the likelihood of condensation is above the threshold value, or a further threshold value, the engine shut down method 300 may be selected.

Turning now to FIG. 5, it shows a method 500 for selecting a mode for shutting down the engine in response to an engine stop request being present. The method 500 begins at 502, which may include determining, estimating, and/or measuring current engine operating parameters. Current engine operating parameters may include one or more of throttle position, EGR valve position, manifold vacuum, engine speed, engine load, vehicle speed, and an air/fuel ratio.

The method 500 proceeds to 504, which may include determining if an engine stop is requested. As described above, an engine stop may be requested if a vehicle operator releases an accelerator pedal, depresses a brake pedal, depresses an ignition button, turns an ignition key, or performs a similar operation. Additionally or alternatively, an engine stop may be requested in response to a switch from a propulsion mode including the internal combustion engine to an all-electric propulsion mode. The switch may occur with or without input from the vehicle operator. For example, the switch may occur once a battery SOC (state of charge) exceeds a threshold SOC (e.g., 80% of a total SOC).

If the engine stop is requested, then the method 500 proceeds to 508, which may include determining if a condensate likelihood is greater than a threshold likelihood. The threshold likelihood may be based on a variety of factors, such as a current engine run-time, an engine temperature, a humidity level of an ambient environment or of the engine, a time elapsed since a previous engine stop, and/or a time elapsed since a previous execution of the second mode. In one example, the threshold likelihood may increase based on a current contamination of the fuel injector. The current contamination may be based on a contamination load of the fuel injector. In some examples, a contamination load less than a threshold load may be tolerated by the fuel injector, wherein combustion conditions are unchanged and the fuel injector may not degrade. However, if the contamination load exceeds the threshold load, or if a future contamination is anticipated to increase the current contamination load to a load greater than the threshold contamination load then the condensate likelihood may be greater than the threshold likelihood and it may be desired to block condensate from forming. In some examples, additionally or alternatively, it may be desired to block any contaminants from collecting onto the fuel injector, wherein the threshold condensate likelihood is based on condensate forming or not forming.

If the condensate likelihood is less than or equal to the threshold likelihood, then condensate may not form during the engine stop and the method 500 proceeds to 510 to execute the first mode. The method 500 proceeds to 512, which includes closing the EGR valve followed by closing the throttle at 514. As such, the first mode may be similar to the soft-stop method described above. By closing the throttle valve, the pressure in the intake manifold may be reduced, which may decrease NVH experienced during the engine stop. As such, the first mode may be selected to perform the engine stop during a plurality of engine conditions where the likelihood of condensate formation is less than the threshold likelihood. Said another way, if contamination and degradation of the fuel injector is not a concern, then the first mode may be selected to stop the engine. The method 500 proceeds to 516, which may include allowing the engine to stall by blocking the fuel supply to the engine.

If the condensate likelihood is greater than the threshold likelihood, then the method 500 proceeds to 518 to execute the second mode. The second mode may be similar to the exhaust gas evacuation engine stop method described above with respect to FIG. 3. The method 500 proceeds to 520, which comprises closing the EGR valve. At 522, the method 500 comprises maintaining the throttle in an open position for a period of time. The period of time being based on one or more of the EGR valve position prior to the engine stop request, estimation of exhaust gas in the intake manifold, and an engine idle speed. For example, if the EGR valve position is in a more open position, then the period of time may be increased relative to the EGR valve position being in a more closed position. As another example, if the estimation of exhaust gas in the intake manifold is relatively high (e.g., a high mass of exhaust gas is in the intake), then the period of time may be increased relative to the estimation of exhaust gas being relatively low. However, as described above, the engine speed may be increased to an engine speed greater than the threshold idle speed, resulting in an increased engine idle speed (e.g., the engine power output is not used to propel the vehicle).

The method 500 proceeds to 524, includes determining if the period of time has elapsed. If the period of time has not elapsed, then the method 500 proceeds to 526 to maintain current operating parameters and continues fueling the engine. If the period of time has elapsed, then the intake may be free of exhaust gas and condensate may not collect on the fuel injector. The method 500 may proceed to 528, which may include blocking the fuel supply to the engine. The throttle may be maintained in the open position to allow the engine to stall. Blocking the fuel supply may comprise where the fuel supply is commanded to decrease to zero substantially instantly. In some examples, additionally or alternatively, once the engine has stalled, the throttle may be moved to the fully closed position.

In this way, an engine stop method may be selected based on a condensate risk, wherein if the condensate risk is unlikely (e.g., equal to or less than the threshold likelihood), then a soft stop method may be selected to minimize NVH experienced by the vehicle operator. If the condensate risk is likely (e.g., greater than the threshold likelihood), then the engine stop may include maintaining a throttle open to evacuate EGR from the intake and engine. The technical effect of evacuating EGR from the intake is to mitigate condensate formation of cylinder and fuel injector surfaces. By selectively executing the exhaust gas evacuation engine stop, NVH experienced by the vehicle operator may be minimized.

An embodiment of a method of shutting down an engine assembly, the engine assembly comprising an exhaust gas recirculation system having a valve for controlling the flow of exhaust gases through the exhaust gas recirculation system, the method comprising closing the valve of the exhaust gas recirculation system, maintaining an inlet throttle of the engine assembly in an open position for a period of time, and cutting the supply of fuel to the engine following the period of time whilst the inlet throttle is in the open position.

A first example of the method further comprises where the supply of fuel to the engine is cut substantially instantaneously.

A second example of the method, optionally including the first example, further comprises where the predetermined period is greater than or equal to 500 ms and less than or equal to 1000 ms.

A third example of the method, optionally includes one or more of the previous examples, further comprises where the throttle is maintained in the open position during and after the fuel cut until the engine as stopped.

A fourth example of the method, optionally includes one or more of the previous examples, further comprises where running the engine at a speed greater than an idle speed of the engine prior to cutting the fuel supply.

An embodiment of a method of operating an engine assembly, the method comprising determining the presence of an engine shutdown request, determining a likelihood of the formation of condensation within cylinders of the engine assembly after the engine has been shut down, selecting an engine shut down procedure based on the likelihood of formation of condensation, and performing the engine shut down procedure to shut down the engine.

A first example of the method further comprises where if it is determined that the likelihood of condensation is above a first threshold value.

A second example of the method, optionally including the first example, further comprises where if it is determined that the likelihood of condensation is below a second threshold value, the engine shut down procedure is selected in order to minimize vibrations of the engine during the engine shut down.

A third example of the method, optionally including one or more of the previous examples, further comprises determining an environmental property of the engine, wherein the likelihood of formation of condensation within the cylinders after the engine has been shut down is determined according to the environmental property of the engine.

A fourth example of the method, optionally including one or more of the previous examples, further comprises where the environmental property comprises one or more selected from a temperature and a humidity of the engine assembly.

A fifth example of the method, optionally including one or more of the previous examples, further comprises determining a current engine run time, wherein the likelihood of formation of condensation within the cylinders after the engine has been shut down is determined according to the current engine running time.

A sixth example of the method, optionally including one or more of the previous examples, further comprises determining a time since a previous engine shut down, wherein the likelihood of formation of condensation within the cylinders after the engine has been shut down is determined according to the time since the previous engine shut down.

A seventh example of the method, optionally including one or more of the previous examples, further comprises determining an engine running time of a previous engine run event, wherein the likelihood of formation of condensation within the cylinders after the engine has been shut down is determined according to the engine running time of the previous engine run event.

An embodiment of a system comprises an engine comprising an exhaust gas recirculation passage fluidly coupled to an engine intake and a controller with computer-readable instructions stored on non-transitory memory thereof that when executed enable the controller to actuate a valve of the exhaust gas recirculation passage to a closed position and maintain an intake throttle position for a period of time based on a position of the valve prior to being actuated to the closed position in response to an engine stop request.

A first example of the system further comprises where the instructions further enable the controller to maintain the intake throttle position in response to the engine stop request when a likelihood of condensate formation is greater than a threshold likelihood.

A second example of the system, optionally including the first example, further includes where the likelihood of condensate is based on one or more of an ambient humidity, an engine runtime, an engine temperature, an intake temperature, an exhaust temperature, and an amount of exhaust gas in the engine intake.

A third example of the system, optionally includes one or more of the previous examples, further comprises where the period of time is adjusted in response to an engine idle speed, wherein the period of time is decreased when the engine idle speed is increased.

A fourth example of the system, optionally includes one or more of the previous examples, further comprises where the instructions further enable the controller to adjust the intake throttle position to a closed position in response a likelihood of condensate formation being less than or equal to a threshold likelihood in the presence of the engine stop request.

A fifth example of the system, optionally includes one or more of the previous examples, further comprises where the instructions further enable the controller to increase an engine speed relative to an idle engine speed during the engine stop request.

A sixth example of the system, optionally includes one or more of the previous examples, further comprises where the engine is arranged on a hybrid vehicle.

A method, comprises in response to an engine stop request, selecting a first mode comprising actuating an EGR valve to a closed position and actuating a throttle valve to a closed position when a likelihood of condensate formation is less than a threshold likelihood and selecting a second mode comprising actuating the EGR valve to the closed position and maintain the throttle valve in an open position for a period of time based on a position of the EGR valve prior to the engine stop request when the likelihood of condensate formation is greater than the threshold likelihood.

A first example of the method further comprises where the second mode further comprises increasing an engine idle speed.

A second example of the method, optionally including the first example, further comprises where the engine stop request is present in response to switching to an all-electric mode, releasing an accelerator pedal, depressing an ignition button, and turning an ignition key.

A third example of the method, optionally including any of the previous examples, further includes where the likelihood of condensate formation increases as an engine temperature decreases, an ambient humidity increases, a current engine runtime decreases, and a time elapsed since a previous engine shutdown increases.

A fourth example of the method, optionally including any of the previous examples, further includes where adjusting the period of time in response to the position of the EGR valve and an engine idle speed, wherein the period of time increases in response to the position of the EGR valve being in a more open position, wherein the period of time decreases in response to the engine idle speed being greater than a threshold idle speed.

A fifth example of the method, optionally including any of the previous examples, further includes where the engine idle speed is intrusively increased to an idle speed greater than the threshold idle speed.

A sixth example of the method, optionally including any of the previous examples, further includes actuating the throttle valve to a closed position in response to the period of time elapsing.

An embodiment for a hybrid vehicle arrangement, comprises an engine shaped to receive intake gas via an intake passage and exhaust gas via an exhaust-gas recirculation passage and a controller with computer-readable instructions stored on non-transitory memory that when executed enable the controller to decrease an engine fuel supply in the presence of an engine stop request, wherein the engine stop request is executed in a first mode when a likelihood of condensate formation is less than or equal to a threshold likelihood and the engine stop request is executed in a second mode when the likelihood of condensate formation is greater than the threshold likelihood.

A first example of the hybrid vehicle arrangement further comprises where the instructions further enable the controller to close an exhaust valve of the exhaust-gas recirculation passage, close a throttle valve of the intake passage, and decrease the engine fuel supply to zero during the first mode.

A second example of the hybrid vehicle arrangement, optionally including the first example, further includes where the instructions further enable the controller to close an exhaust valve of the exhaust-gas recirculation passage, maintain an open position of a throttle valve of the intake passage for a period of time, increase an idle engine speed to an idle speed greater than a threshold idle speed, and decrease the engine fuel supply to zero following the period of time being elapsed during the second mode.

A third example of the hybrid vehicle arrangement, optionally including one or more of the previous examples, further comprises where the likelihood of condensate formation is based on one or more of an engine temperature, an ambient humidity, and an exhaust gas temperature.

A fourth example of the hybrid vehicle arrangement, optionally including one or more of the previous examples, further comprises where the engine stop request is in response to one or more of a switch to an all-electric drive mode, an accelerator pedal being released, a brake pedal being depressed, an ignition key being turned, and an ignition button being depressed.

A fifth example of the hybrid vehicle arrangement, optionally including one or more of the previous examples, further comprises where the period of time is adjusted in response to a position of an exhaust valve prior to the engine stop request, wherein the period of time is decreased in response to the position of the exhaust valve being closer to a fully closed position than a fully open position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine comprising an exhaust gas recirculation passage fluidly coupled to an engine intake; and
a controller with computer-readable instructions stored on non-transitory memory thereof that when executed enable the controller to:
actuate a valve of the exhaust gas recirculation passage to a closed position;
maintain an intake throttle position for a period of time based on a position of the valve prior to being actuated to the closed position in response to an engine stop request when a likelihood of condensate formation is greater than a threshold likelihood, the likelihood of condensate based on one or more of an ambient humidity, an engine runtime, an engine temperature, an intake temperature, an exhaust temperature, and an amount of exhaust gas in the engine intake; and
increase an engine speed relative to an idle engine speed during the engine stop request, wherein a fuel supply to the engine is cut after the period of time.

2. The system of claim 1, wherein the engine runtime is based on one or more of a current engine runtime and a previous engine runtime.

3. The system of claim 1, wherein the period of time is adjusted in response to an engine idle speed, wherein the period of time is decreased when the engine idle speed is increased.

4. The system of claim 1, wherein the instructions further enable the controller to adjust the intake throttle position to a closed position in response a likelihood of condensate formation being less than or equal to a threshold likelihood in response to the engine stop request.

5. A system, comprising:
an engine comprising an exhaust gas recirculation passage fluidly coupled to an engine intake; and
a controller with computer-readable instructions stored on non-transitory memory thereof that when executed enable the controller to:
actuate a valve of the exhaust gas recirculation passage to a closed position; and
maintain an intake throttle position for a period of time based on a position of the valve prior to being actuated to the closed position in response to an engine stop request when a likelihood of condensate formation is greater than a threshold likelihood,the likelihood of condensate is based on one or more of an ambient humidity, an engine runtime, an engine temperature, an intake temperature, an exhaust temperature, and an amount of exhaust gas in the engine intake, wherein a fuel supply to the engine is cut after the period of time, wherein the engine is arranged on a hybrid vehicle.

6. A method, comprising:
in response to an engine stop request, selecting a first mode comprising actuating an EGR valve to a closed position and actuating a throttle valve to a closed position when a likelihood of condensate formation is less than a threshold likelihood, the likelihood of condensate is based on one or more of an ambient humidity, an engine runtime, an engine temperature, an intake temperature, an exhaust temperature, and an amount of exhaust gas in an engine intake; and
selecting a second mode comprising actuating the EGR valve to the closed position and maintaining the throttle valve in an open position for at least a period of time based on a position of the EGR valve prior to the engine stop request when the likelihood of condensate formation is greater than the threshold likelihood, wherein a fuel supply to the engine is cut after the period of time.

7. The method of claim 6, wherein the second mode further comprises increasing an engine idle speed.

8. The method of claim 6, wherein the engine stop request is present in response to switching to one or more of an all-electric mode, releasing an accelerator pedal, depressing an ignition button, and turning an ignition key.

9. The method of claim 6, wherein the likelihood of condensate formation increases as an engine temperature decreases, an ambient humidity increases, a current engine runtime decreases, and a time elapsed since a previous engine shutdown increases.

10. The method of claim 8, further comprising adjusting the period of time in response to the position of the EGR valve and an engine idle speed, wherein the period of time increases in response to the position of the EGR valve being in a more open position, wherein the period of time decreases in response to the engine idle speed being greater than a threshold idle speed.

11. The method of claim 10, wherein the engine idle speed is intrusively increased to an idle speed greater than the threshold idle speed.

12. The method of claim 6, further comprising cutting the fuel supply to the engine following the period of time elapsing, wherein the throttle valve is open following the period of time elapsing.

13. A hybrid vehicle arrangement, comprising:
an engine shaped to receive intake gas via an intake passage and exhaust gas via an exhaust-gas recirculation passage; and
a controller with computer-readable instructions stored on non-transitory memory that when executed enable the controller to:
decrease an engine fuel supply in the presence of an engine stop request; wherein
the engine stop request is executed in a first mode when a likelihood of condensate formation is less than or equal to a threshold likelihood, the likelihood of condensate is based on one or more of an ambient humidity, an engine runtime, an engine temperature, an intake temperature, an exhaust temperature, and an amount of exhaust gas in the intake passage; and
the engine stop request is executed in a second mode when the likelihood of condensate formation is greater than the threshold likelihood, wherein a fuel supply to the engine is cut after a period of time during which a throttle valve position is maintained.

14. The hybrid vehicle arrangement of claim 13, wherein the instructions further enable the controller to close an exhause valve of the exhaust-gas recirculation passage, close a throttle valve of the intake passage, and decrease the engine fuel supple to zero during the first mode.

15. The hybrid vehicle arrangement of claim 13, wherein the instructions further enable the controller to close an exhause valve of the exhaust-gas recirculation passage, maintain an open position of a throttle valve of the intake passage for a period of time, increase an idle engine speed to an idle speed greater than a threshold isle speed, and decrease the engine fuel supply to zero following the period of time being elapsed during the second mode.

16. the hybrid vehicle arrangement if claim 13, wherein the liklihood of condensate formation is based on one or more of an engine temperature, an ambient humidity, and an exhause gas temperature.

17. The hybrid vehicle arrangement of claim 13, wherein the engine stop request of in response to one or more of a switch to an all-electric drive mode, an accelerator pedal being released, a breal pedal being depressed, an ignition key being turned on, and an ifnition button being depressed.

18. The hybrid vehicle arrangement of claim 13, wherein the period of time is adjusted in response to a position of an exhause valve prior to the engine stop request, wherein the period of time is decreased in response to the position of the exhause valve being closer to a fully closed position than a fully open position.

* * * * *